US011722359B2

(12) United States Patent
Fenoglio et al.

(10) Patent No.: US 11,722,359 B2
(45) Date of Patent: Aug. 8, 2023

(54) DRIFT DETECTION FOR PREDICTIVE NETWORK MODELS

(71) Applicant: Cisco Technology, Inc., San Jose, CA (US)

(72) Inventors: Enzo Fenoglio, Issy les Moulineaux (FR); David John Zacks, Vancouver (CA); Zizhen Gao, San Ramon, CA (US); Carlos M. Pignataro, Cary, NC (US); Dmitry Goloubev, Waterloo (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/479,297

(22) Filed: Sep. 20, 2021

(65) Prior Publication Data
US 2023/0093130 A1    Mar. 23, 2023

(51) Int. Cl.
*H04L 29/08* (2006.01)
*H04L 41/0631* (2022.01)
(Continued)

(52) U.S. Cl.
CPC .......... *H04L 41/064* (2013.01); *G06F 18/214* (2023.01); *H04L 41/16* (2013.01); *H04L 43/04* (2013.01)

(58) Field of Classification Search
CPC ........ H04L 41/064; H04L 41/16; H04L 43/04
See application file for complete search history.

(56) References Cited

U.S. PATENT DOCUMENTS

2017/0249564 A1*   8/2017   Garvey ............. G06Q 10/0631
2018/0052804 A1    2/2018   Mikami et al.
(Continued)

FOREIGN PATENT DOCUMENTS

CN        109902703 A        6/2019

OTHER PUBLICATIONS

Chin-Chia Michael Yeh, et al., "Matrix Profile VI: Meaningful Multidimensional Motif Discovery," IEEE, https://www.es.ucr.edu/~eamonn/Motif_Discovery_ICDM.pdf, Nov. 18, 2017, 10 pages.
(Continued)

*Primary Examiner* — Adnan M Mirza
(74) *Attorney, Agent, or Firm* — Edell, Shapiro & Finnan, LLC (57) ABSTRACT

A method, computer system, and computer program product are provided for detecting drift in predictive models for network devices and traffic. A plurality of streams of time-series telemetry data are obtained, the time-series telemetry data generated by network devices of a data network. The plurality of streams are analyzed to identify a subset of streams, wherein each stream of the subset of streams includes telemetry data that is substantially empirically distributed. The subset of streams of time-series data are analyzed to identify a change point. In response to identifying the change point, additional time-series data is obtained from one or more streams of the plurality of streams of time-series telemetry data. A predictive model is trained using the additional time-series data to update the predictive model and provide a trained predictive model.

20 Claims, 6 Drawing Sheets

(51) Int. Cl.
    *H04L 43/04*     (2022.01)
    *H04L 41/16*     (2022.01)
    *G06F 18/214*     (2023.01)

(56) References Cited

U.S. PATENT DOCUMENTS

2020/0389387 A1* 12/2020 Magzimof ............ H04W 40/04
2021/0184958 A1   6/2021 Kolar et al.

OTHER PUBLICATIONS

Tania Cerquitelli, et al., "Automating concept-drift detection by self-evaluating predictive model degradation," Cornell University, https://arxiv.org/abs/1907.08120, Jul. 18, 2018, 3 pages.

Pantelis Chronis, et al., "Optimizing the training of time series forecasting models: A change point detection approach," Apr. 2017, 11 pages.

Samaneh Aminikhanghahi, et al., "Real-Time Change Point Detection with Application to Smart Home Time Series Data," IEEE, Jun. 25, 2018, 14 pages.

\* cited by examiner

DRIFT DETECTION FOR PREDICTIVE NETWORK MODELS

TECHNICAL FIELD

The present disclosure relates to predictive modeling, and more specifically, to detecting drift in predictive models involving network devices and traffic.

BACKGROUND

Predictive models are created to detect and foretell events of interest, such as events involving devices and traffic in a communication network. Additionally, predictive models can enable the decoupling of predictions regarding device behavior from the devices themselves; thus, predictions can be made even when a device itself is not available or is not able to produce the data needed for predictions (e.g., due to load, bandwidth availability, etc.). Predictive models remain useful as long as the network devices (or groups of network devices, or components of a network device) are coherent with the model. As the operation of network devices evolve (e.g., due to seasonal daily traffic changes, due to changes in configuration, environment, or hardware, etc.) a model becomes less accurate and eventually requires updating.

To update a model, it is necessary to collect sufficient new data that is representative of the "new" behavior. This, however, requires a clear understanding on when the "new" behavior began. Since the reasons for behavior change can be so broad and general, it is impractical (and often impossible) to enumerate all of the possible triggers for behavior change.

DESCRIPTION OF EXAMPLE EMBODIMENTS

Overview

According to one embodiment, techniques are provided for detecting drift in predictive models for network devices and traffic. A plurality of streams of time-series telemetry data are obtained, the time-series telemetry data generated by network devices of a data network. The plurality of streams are analyzed to identify a subset of streams, wherein each stream of the subset of streams includes telemetry data that is substantially empirically distributed. The subset of streams of time-series data are analyzed to identify a change point. In response to identifying the change point, additional time-series data is obtained from one or more streams of the plurality of streams of time-series telemetry data. A predictive model is trained using the additional time-series data to update the predictive model and provide a trained predictive model. The computing network may be a communication network that includes networking devices, such as switches, routers, gateways, firewalls, etc., as well as various computing and data storage equipment.

Example Embodiments

Embodiments are provided for to predictive modeling, and more specifically, to detecting drift in predictive models involving network devices and traffic.

In the field of machine learning, predictive models can be developed to detect and foretell events of interest that occur in a communication network. These predictive models can have numerous applications in a variety of networks, such as wireless networks, sensor networks, smart grids, and other computing and/or communication networks. Predictive models can be produced by applying machine learning techniques to data that is representative of a network's behavior, so that particular trends or occurrences in the data can be identified and correlated to current or upcoming events of interest. For example, machine learning techniques may produce a model that estimates with a high degree of accuracy, that a network outage is forthcoming based on the data, or lack of data, obtained from a particular device, or based on a pattern that is observed when data from several devices is analyzed in combination.

When a predictive model is developed via machine learning techniques, the training data used by the machine learning algorithm should be representative of the network to which the predictive model will be applied, or else the resulting model will likely be unable to make accurate predictions. However, model drift, also referred to as model decay, can occur when the behavior of a network changes over time, rendering the predictive model unable to accurately forecast events.

When model drift occurs, the model can be updated using data that is representative of a network's new behavior. However, it can be difficult to identify when, exactly, a network's behavior has changed, especially when the change has recently occurred. Moreover, a change in network behavior can be difficult to pinpoint when there are many different sources of time-series data that must be analyzed, as individual trends can be masked by the combined noise of the time-series data from all sources.

Accordingly, present embodiments solve the problem of rapidly identifying model drift by identifying a subset of data sources whose time-series data can be more readily analyzed to identify changes in the overall network behavior. In particular, the telemetry data of network devices is analyzed to identify a subset of devices whose data fits a particular pattern, and time-series data from those identified devices can be monitored to automatically identify a change in network behavior. Accordingly, present embodiments can automate the re-training and updating of a predictive model, enabling predictive models to be applied to networks in a manner that ensures model accuracy. Thus, present embodiments provide the practical application of greatly reducing or eliminating the span of time that model drift goes unnoticed, thereby avoiding any possible issues associated with incorrect model predictions, such as the false positives or false negatives. For example, a model that has drifted may incorrectly identify that a network outage is forthcoming, which can be relied upon to the detriment of overall network performance. Accordingly, claimed embodiments improve the field of predictive modeling by providing a mechanism for rapidly detecting when a model is no longer accurate, and automatically updating the model to address the model drift.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Figure 1:
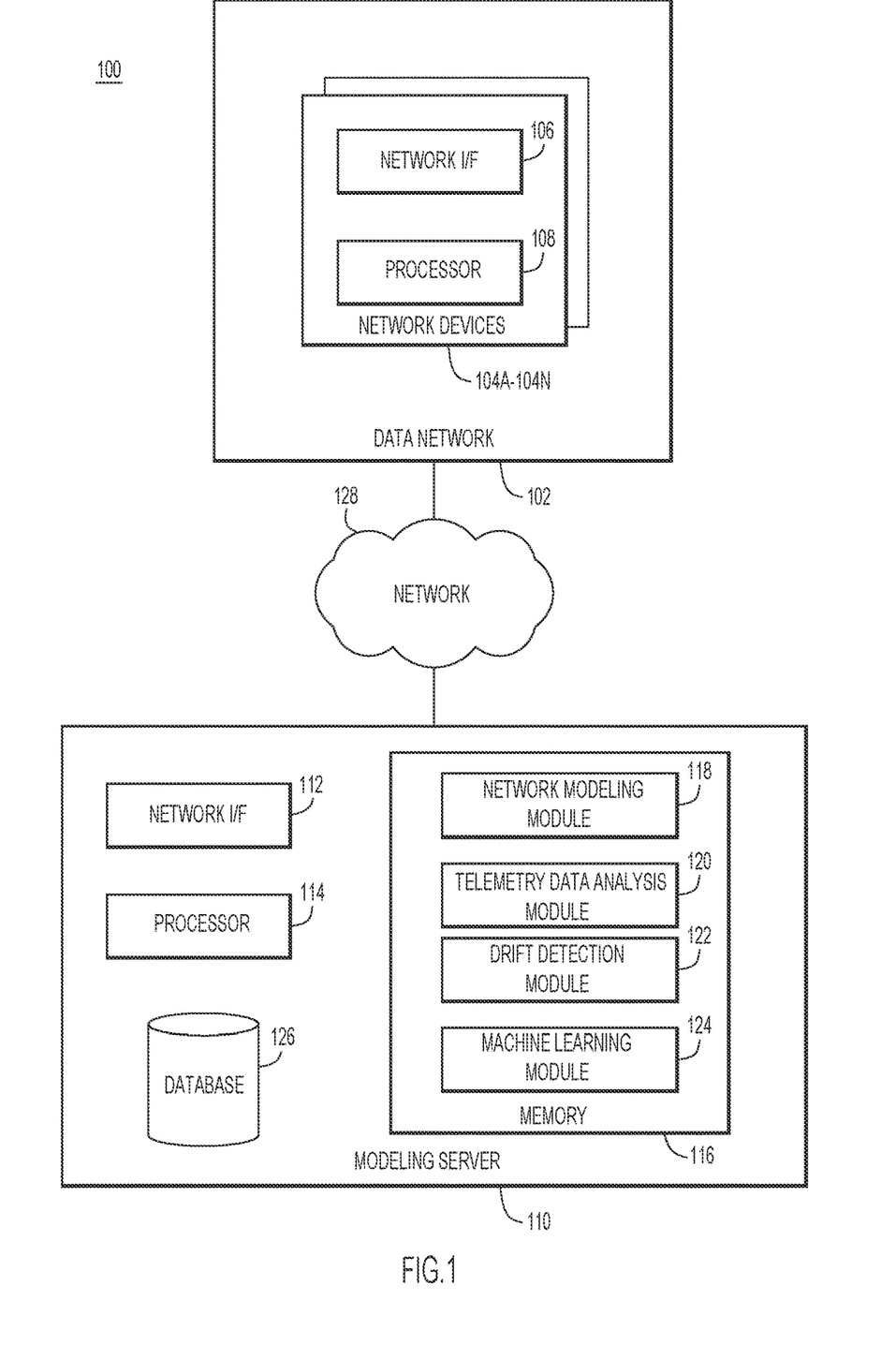
FIG. 1 is a block diagram depicting an environment for modeling network devices and traffic, in accordance with an example embodiment.

Embodiments are now described in detail with reference to the figures. FIG. 1 is a block diagram depicting an environment 100 for modeling network devices and traffic, in accordance with an example embodiment. As depicted, environment 100 includes a data network 102, a modeling server 110, and a (communication) network 128. The data network 102 includes a plurality of network devices 104A-104N that constitute the network's infrastructure. It is to be understood that the functional division among components of environment 100 have been chosen for purposes of explaining various embodiments and is not to be construed as a limiting example. Data network 102 may include additional computing and data storage equipment as well, though not shown in FIG. 1, for simplicity.

Data network 102 includes a plurality of network devices 104A-104N. Each network device 104A-104N includes a network interface (I/F) 106, and at least one processor 108. The network devices 104A-104N may further include network processing hardware (e.g., one or more Application Specific Integrated Circuits). Each network device 104A-104N may be a server, a router, a hub, a switch, a bridge, a gateway, a modem, a repeater, an access point, a firewall, storage device, computing device, an endpoint device (e.g., a laptop computer, a tablet computer, a netbook computer, a personal computer (PC), a desktop computer, a personal digital assistant (PDA), or a smart phone) or any other programmable electronic device capable of executing computer readable program instructions and performing networking-related operations in data network 102. Moreover, the network devices 104A-104N may be virtual in the sense that they are embodied as software running on a computing device. Network interface 106 enables each network device 104A-104N to send and receive data over a network, such as network 128, as well as within data network 102. In general, network devices 104A-104N may perform any networking or computing task, including transmitting, receiving, and/or processing of data obtained from, or provided to, network-accessible computing devices, including devices internal and/or external to data network 102. Each network device 104A-104N may include internal and external hardware components, as depicted and described in further detail with respect to FIG. 5.

Modeling server 110 includes a network interface (I/F) 112, at least one processor 114, memory 116, and a database 126. Memory 116 stores software instructions for a network modeling module 118, a telemetry data analysis module 120, a drift detection module 122, and a machine learning module 124. Modeling server 110 may include a rack-mounted server, or any other programmable electronic device capable of executing computer readable program instructions. Network interface 112 may include one or more network interface cards, line cards, etc., enables components of modeling server 110 to send and receive data over a network, such as network 128. In general, modeling server 110 applies a predictive model to a data network, such as data network 102, identifies model drift, and automatically updates models to mitigate the effects of model drift. Modeling server 110 may include internal and external hardware components, as depicted and described in further detail with respect to FIG. 5.

Network modeling module 118, telemetry data analysis module 120, drift detection module 122, and machine learning module 124 may include one or more modules or units to perform various functions of the embodiments described below. Network modeling module 118, telemetry data analysis module 120, drift detection module 122, and machine learning module 124 may be implemented by any combination of any quantity of software and/or hardware modules or units, and may reside within memory 116 of modeling server 110 for execution by a processor, such as processor 114.

Network modeling module 118 applies a trained predictive modeling algorithm to predict events in a data network, such as data network 102. In particular, network modeling module 118 may receive time-series data, such as telemetry data, from devices a network (e.g., network devices 104A-104N) and use the time-series data as input into the predictive modeling algorithm. The predictive modeling algorithm may be trained using conventional or other machine learning techniques to analyze the time-series data in order to perform forecasting. In some embodiments, network modeling module 118 forecasts events of interest in a data network, such as an event that impacts service or other anomalous event. In some embodiments, network modeling module 118 forecasts data to model the output of one or more network devices when those devices become temporarily unavailable or their output data otherwise becomes inaccessible.

In some embodiments, the predictive modeling algorithm of network modeling module 118 is trained using conventional or other machine learning techniques by machine learning module 124. The training data for the predictive modeling algorithm may include time-series telemetry data obtained from network devices 104A-104N of data network 102. In various embodiments, the predictive modeling algorithm nay be trained using unsupervised, semi-supervised, or supervised training techniques. The predictive modeling algorithm may be trained using a sample of time-series data collected from all of network devices 104A-104N, or the training corpus may include time-series data collected from a subset of network devices 104A-104N. Additionally or alternatively, training may be performed using other training data and/or data obtained as a result of processing time-series data collected from network devices 104A-104N. The particular type of machine learning approach that is employed may include any suitable techniques for predicting network behavior, such as deep learning (e.g., neural networks, long short term memory networks, generative adversarial networks, etc.), decision trees, support-vector machines, Bayesian networks, and the like.

Telemetry data analysis module 120 analyzes time-series telemetry data obtained from network devices 104A-104N in order to identify a subset of data that can be used to determine when model drift occurs due to a change in network behavior. Telemetry data analysis module 120 may analyze data in real-time as it is received from, or generated by, network devices 104A-104N, or telemetry data analysis module 120 may analyze a history of telemetry data. In particular, telemetry data analysis module 120 analyzes time-series data to select a subset of network devices 104A-104N whose time-series data can be used for model drift detection.

In some embodiments, telemetry data analysis module 120 identifies a subset of network devices 104A-104N having time-series data that includes rapidly-changing parameters, rather than slowly-changing parameters. For instance, a subset of network devices 104A-104N may be selected whose telemetry data indicates repeated patterns of behavior, such as recurring bursts of network activity.

In some embodiments, telemetry data analysis module 120 identifies a subset of network devices 104A-104N whose time-series data conforms to a particular statistical distribution. In particular, telemetry data analysis module 120 may select a subset of network devices 104A-104N whose time-series data most closely matches an empirical distribution function, also referred to as an empirical Cumulative Distribution Function (eCDF). The subset of time-series data sources can be identified using conventional or other statistical techniques for determining how well data fits a particular distribution (e.g., an empirical distribution).

Drift detection module 122 may detect model drift based on the subset of network devices 104A-104N selected by telemetry data analysis module 120. In particular, drift detection module 122 may analyze time-series data corresponding to the selected subset of devices using conventional or other statistical analysis techniques to identify deviations from an established patter. Drift detection module 122 may analyze the time-series data as the data is made available and/or according to a schedule, such as every twenty minutes, etc. In some embodiments, drift detection module 122 analyzes time-series data using a matrix profile technique, which is a domain-agnostic, mathematical technique that uses a sliding window of time-series data to compute similarity joins for time-series sub-sequences for identify motifs, which are repeating patterns, and discords, which are anomalies. In a sliding window, telemetry data is grouped within a window that slides across the data stream according to a specified interval. For example, a time-based sliding window with a length of ten seconds and a sliding interval of five seconds contains telemetry data that arrives within a ten-second window, and the sets of data within the windows can be evaluated every five seconds. In other embodiments, a tumbling window may be utilized in which any particular tuple of telemetry data belongs to only one window.

Accordingly, drift detection module 122 can be configured to identify model drift based on a lack of repeating patterns and/or based on the occurrence of one or more anomalies. In various embodiments, criteria may be stipulated for drift detection, such as model drift being identified when a pattern fails to repeat for a number of cycles (e.g., for a predetermined amount of time), or when a predetermined number of anomalies occur.

Additionally or alternatively, drift detection module 122 may detect likely model drift based on the occurrence of one or more predefined events that indicate that a network's behavior has changed. In particular, the predefined events can include configuration changes, such as encapsulation changes, network address changes, and changes in features that are enabled or disabled. Changes in neighbor discovery protocols, such as Link Layer Discovery Protocol (LLDP), Link Aggregation Control Protocol (LACP), Port Aggregation Protocol (PAGP), Border Gateway Protocol (BGP), Open Shortest Path First (OSPF) protocol, and the like, may also indicate that a network change has occurred.

Additionally or alternatively, drift detection module 122 may detects model drift by comparing an anomaly density to an estimated or expected repair time for the anomaly. The time of repair may be determined from a repair service level agreement (SLA), and if there is no such SLA in place, the time of repair can be estimated based on key performance indicators (KPIs) of the same system that detects anomalies, which indicate how quickly previous anomalies have been resolved. If anomalies are persisting over a long duration of time, such as a multiple of the amount of time estimated to repair the anomalies, then it may indicate that the events are no longer anomalous but are actually indicative of new network behavior. Accordingly, drift detection module 122 can detect model drift when anomalies persist beyond a threshold duration of time, which can be a predetermined value that is longer (e.g., twice as long, four times as long, etc.) as the amount of time estimated to repair the anomalies.

Machine learning module 124 trains predictive models for data network 102 using telemetry data obtained from network devices 104A-104N. The particular type of machine learning approach that is employed may include any suitable techniques for predicting network behavior, such as deep learning (e.g., neural networks, long short term memory networks, generative adversarial networks, etc.), decision trees, support-vector machines, Bayesian networks, and the like. Additionally, learning may be unsupervised, semi-supervised, or supervised. In some embodiments, machine learning module 124 performs feature selection via an unsupervised learning process to select as features particular network devices whose time-series data can be used as input to predict network events or perform data forecasting.

Machine learning module 124 may automatically obtain training data and train a new predictive model in response to drift detection module 122 determining that model drift has occurred. In particular, machine learning module 124 may begin collecting telemetry data that is generated by, or obtained from, network devices 104A-104N at a point after the time at which the model drift is identified. Thus, the newly-acquired telemetry data may be indicative of new network behavior. Machine learning module 124 may collect telemetry data for a predetermined amount of time before beginning training of a new predictive model. In some embodiments, machine learning module 124 may wait a threshold duration of time after the point of model drift before collecting and using telemetry data in order to ensure that any patterns in the new network behavior are well-established.

Database 126 may include any non-volatile storage media known in the art. For example, database 126 can be implemented with a tape library, optical library, one or more independent hard disk drives, or multiple hard disk drives in a redundant array of independent disks (RAID). Similarly, data in database 126 may conform to any suitable storage architecture known in the art, such as a file, a relational database, an object-oriented database, and/or one or more tables. Database 126 may store data relating to machine learning tasks, such as learning algorithms, trained predictive models, and the like. Additionally, database 126 may store telemetry data obtained from network devices 104A-104N, which may be used as training data for machine learning tasks.

Network 128 may include a local area network (LAN), a wide area network (WAN) such as the Internet, or a combination of the two, and includes wired, wireless, or fiber optic connections. In general, network 128 can be any combination of connections and protocols known in the art that will support communications between data network 102, including network devices 104A-104N, and modeling server 110 via their respective network interfaces in accordance with the described embodiments.

Figure 2A:
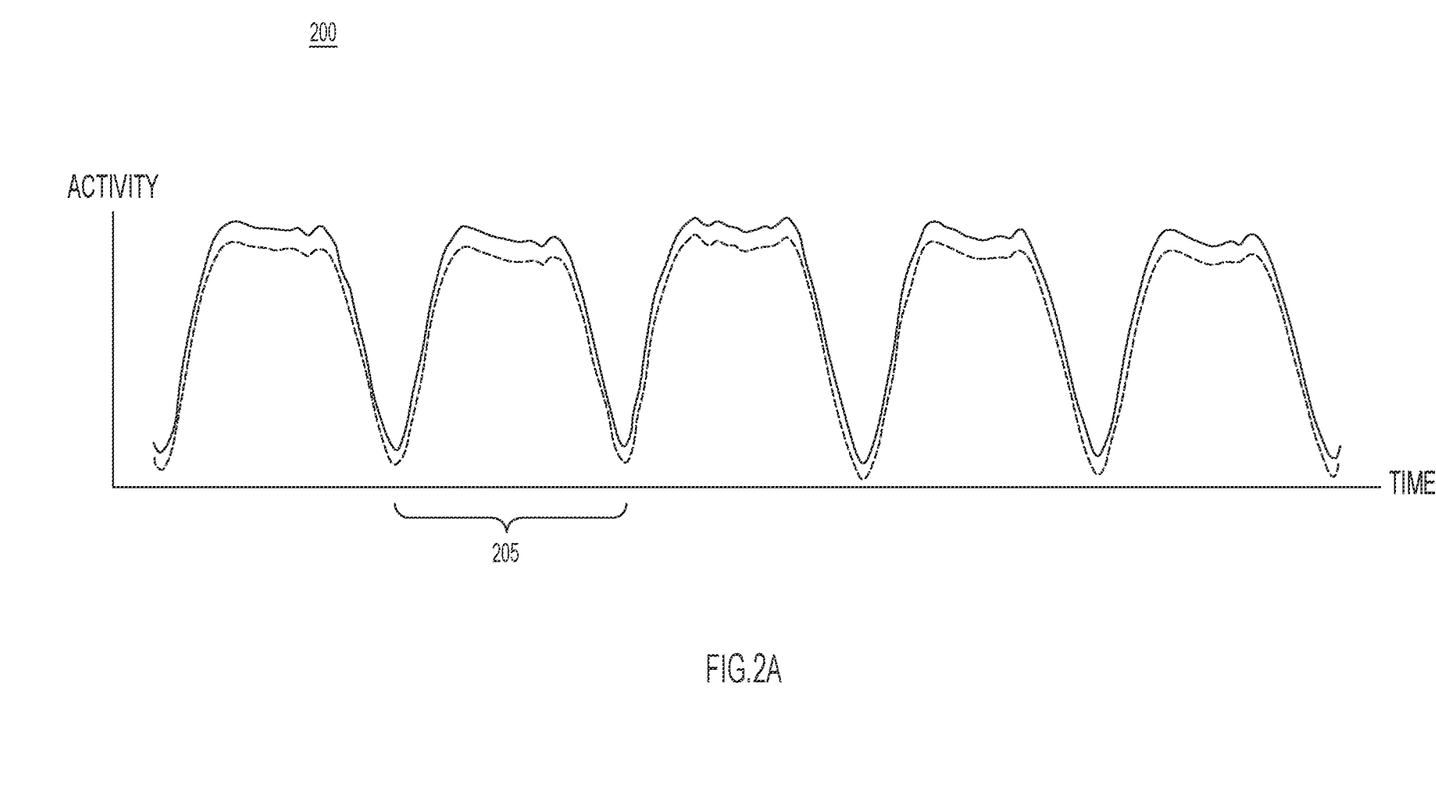
FIG. 2A is a graph depicting a group of telemetry data from different sources, in accordance with an example embodiment.

FIG. 2A is a graph 200 depicting a group of telemetry data from different sources, in accordance with an example embodiment. As depicted, the graph includes a horizontal axis of time and a vertical axis of activity. Graph 200 may depict network activity based on the telemetry data of a selected subset of computing devices that follow a recurring pattern. For example, the telemetry data in graph 200 may correspond to an amount of fabric data received at a switch, or an amount of network data transmitted by another switch. As depicted, a periodicity or seasonality 205 is shown, which may correspond to a day of time. Thus, in the depicted example, the network activity may reach a minimum at a particular time of day (e.g., at night) before returning to a high activity status the remainder of the day. Thus, graph 200 illustrates how repeating patterns in network behavior can be easily observed when a subset of network devices is selected for observation in accordance with present embodiments.

Figure 2B:
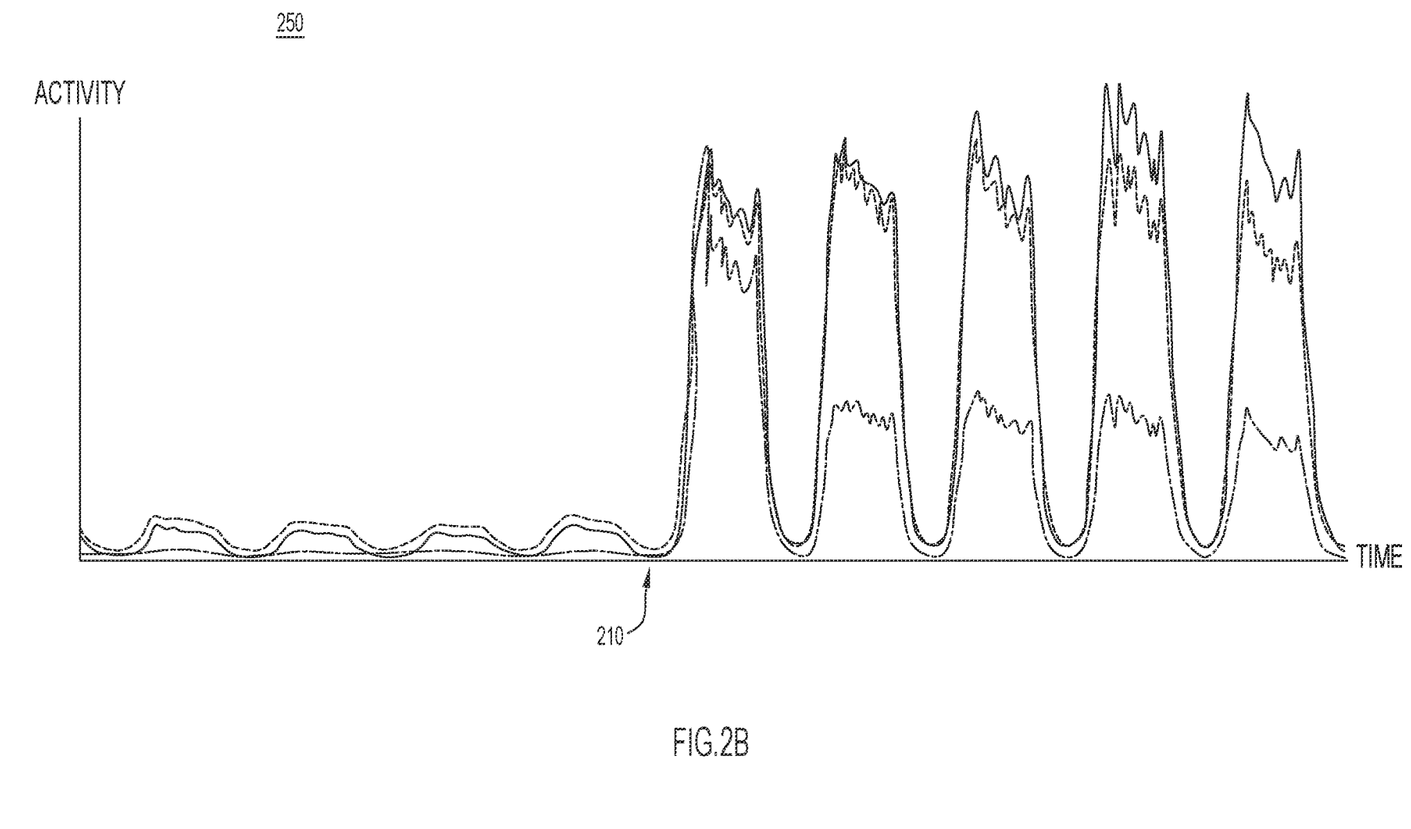
FIG. 2B is a graph depicting a group of telemetry data from different sources when model drift occurs, in accordance with an example embodiment.

FIG. 2B is a graph 250 depicting a group of telemetry data from different sources when model drift occurs, in accordance with an example embodiment. As depicted, the graph includes a horizontal axis of time and a vertical axis of activity. Graph 250 may depict network activity before and after a change point 210, which corresponds to a change in network behavior. As depicted, prior to change point 210, the network activity of selected network devices behaves according to a predictable pattern. After change point 210, however, the pattern changes. Thus, graph 250 illustrates how change points in network behavior can be easily observed when a subset of network devices is selected for observation in accordance with present embodiments.

Figure 3:
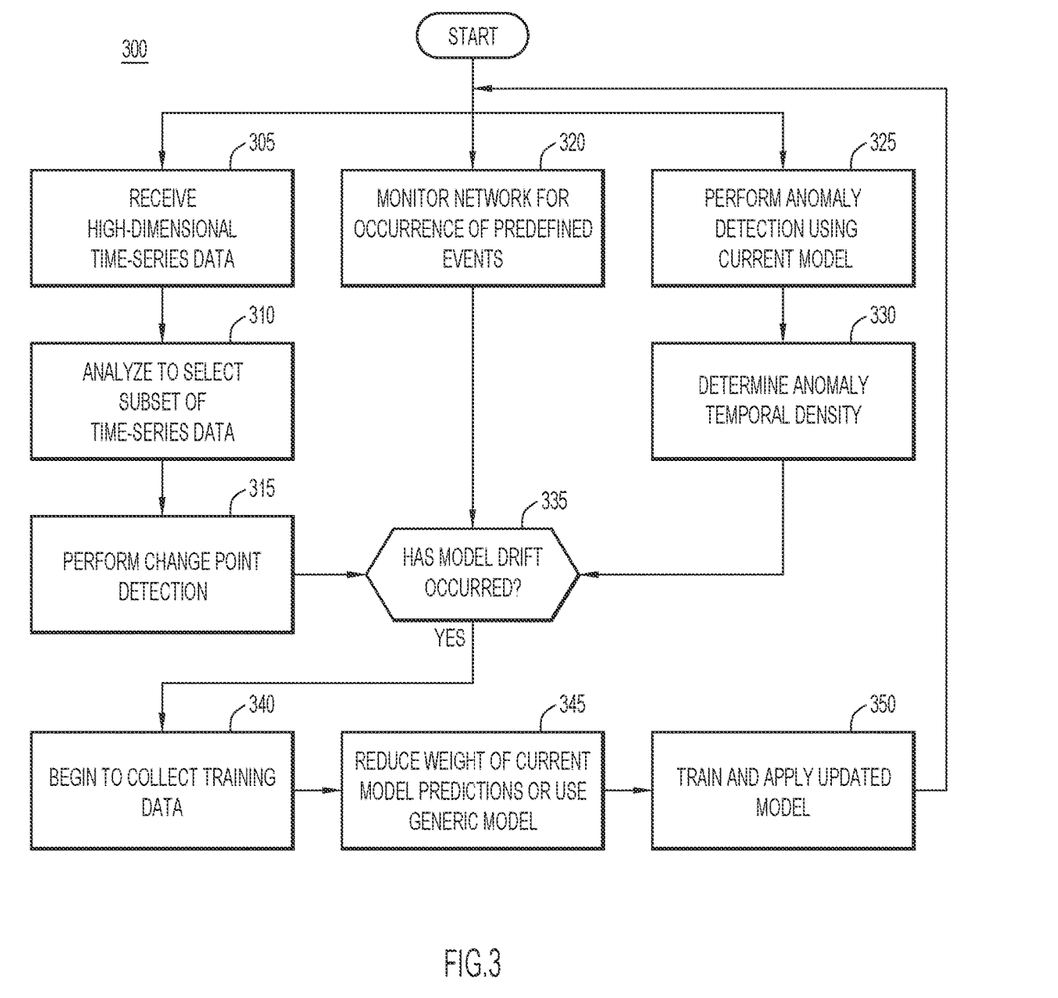
FIG. 3 is a flow chart depicting a method for detecting model drift and retraining of the model, in accordance with an example embodiment.

FIG. 3 is a flow chart depicting a method 300 for detecting model drift and retraining of the model, in accordance with an example embodiment.

High-dimensional time-series data is received at operation 305. The time-series data may be telemetry data that is obtained from a plurality of network devices, such as network devices 104A-104N of data network 102. In some embodiments, each stream of time-series data may correspond to a single network device. In other embodiments, the dimensionality may be more granular, and there may be different dimensions of time-series data per device. For example, each device may include at least a "data transmitted" dimension and a "data received" dimension.

The time-series data is analyzed at operation 310 to select a subset of the time-series data. The dimensionality of the time-series data can be greatly reduced by selecting a subset of streams of time-series data that have recurring patterns. In particular, sets of time-series data can be identified that are substantially empirically-distributed (e.g., most closely matching an empirical distribution function).

Change point detection is performed on the selected subset of time-series data at operation 315. In some embodiments, a matrix profile-based mathematical technique is applied to the selected subset of time-series data to identify a change point. Change point detection can be achieved using any conventional or other non-parametric approaches, including a Kullback-Leibler Importance Estimation Procedure (KLIEP)-based technique, a symmetric Kullback-Leibler divergence (DSKL)-based technique, a least squares importance fitting (LSIF)-based technique, and the like. In particular, sliding windows of time-series data can be compared to each other to determine a density ratio on consecutive time intervals; when the density ratio changes beyond a predetermined threshold value, a change point in the time-series data is identified.

While change point detection is performed, other techniques can be performed to determine whether model drift has occurred. The data network can be monitored for the occurrence of specific predefined events at operation 320. The events may be predefined, and can include interface configuration changes and/or protocol changes. For example, interface configuration changes can include encapsulation changes, network address changes, and changes to enabled or disabled features. Additionally, events like neighbor protocol changes (e.g., for protocols such as LLDP, LACP, PAGP, BGP, OSPF, etc.) can be indicative of a change in network behavior, and therefore, model drift.

Additionally or alternatively, model drift can be detected by performing anomaly detection using the currently-applied predictive model at operation 325. As anomalies are identified, the time of each anomaly is noted so that an anomaly temporal density can be determined. The anomaly temporal density is determined at operation 330 and compared to an expected repair time for the network anomalies. If anomalies persist for a predefined amount of time longer than the expected time required to repair the underlying cause of the anomalies, then the network may be experiencing new patterns of behavior, and the events may no longer be considered anomalous.

Operation 335 determines whether model drift has occurred. If a change point is identified at operation 315, if a predetermined event is identified at operation 320, and/or if anomaly persistence is identified at operation 330, then operation 335 may determine that model drift has occurred, and that the current predictive model may no longer be valid. If operation 335 determines that model drift has not occurred, then method 300 may continue to observe for any indicia of model drift by repeating operations 305-330.

Training data for an updated model is collected at operation 340. Training data can be collected by gathering additional time-series telemetry data from network devices until sufficient data is obtained that is representative of the network's new behavior. In some embodiments, a predetermined amount of training data is collected before training of a new model is performed.

The weight of the current model's predictions can be reduced, or a generic model employed in lieu of the previous model, at operation 345. The weight of a current model's predictions might be reduced so that, while the model is still employed, any other automated actions that rely on the model's predictions rely on those predictions to a lesser extent. Alternatively, the current model may be deactivated, and a substitute fallback model may be employed until an updated model can be trained. The fallback model may be a generic model and may or may not be generated as a result of machine learning.

An updated model is trained and applied at operation 350. The updated predictive model is trained using conventional or other machine learning techniques and based on the newly-collected time-series telemetry data. Accordingly, the updated model may accurately predict network events and/or perform data forecasting as long as the network's behavior does not encounter another change point. In various embodiments, the updated model may be used for anomaly detection (e.g., monitoring network device packet forwarding in the data plane for anomalies), or the updated model may be a prediction model that can predict upcoming events such as hardware failures in network devices. Once the updated model is employed, method 300 may continue to observe for any indicia of model drift by repeating operations 305-330.

Figure 4:
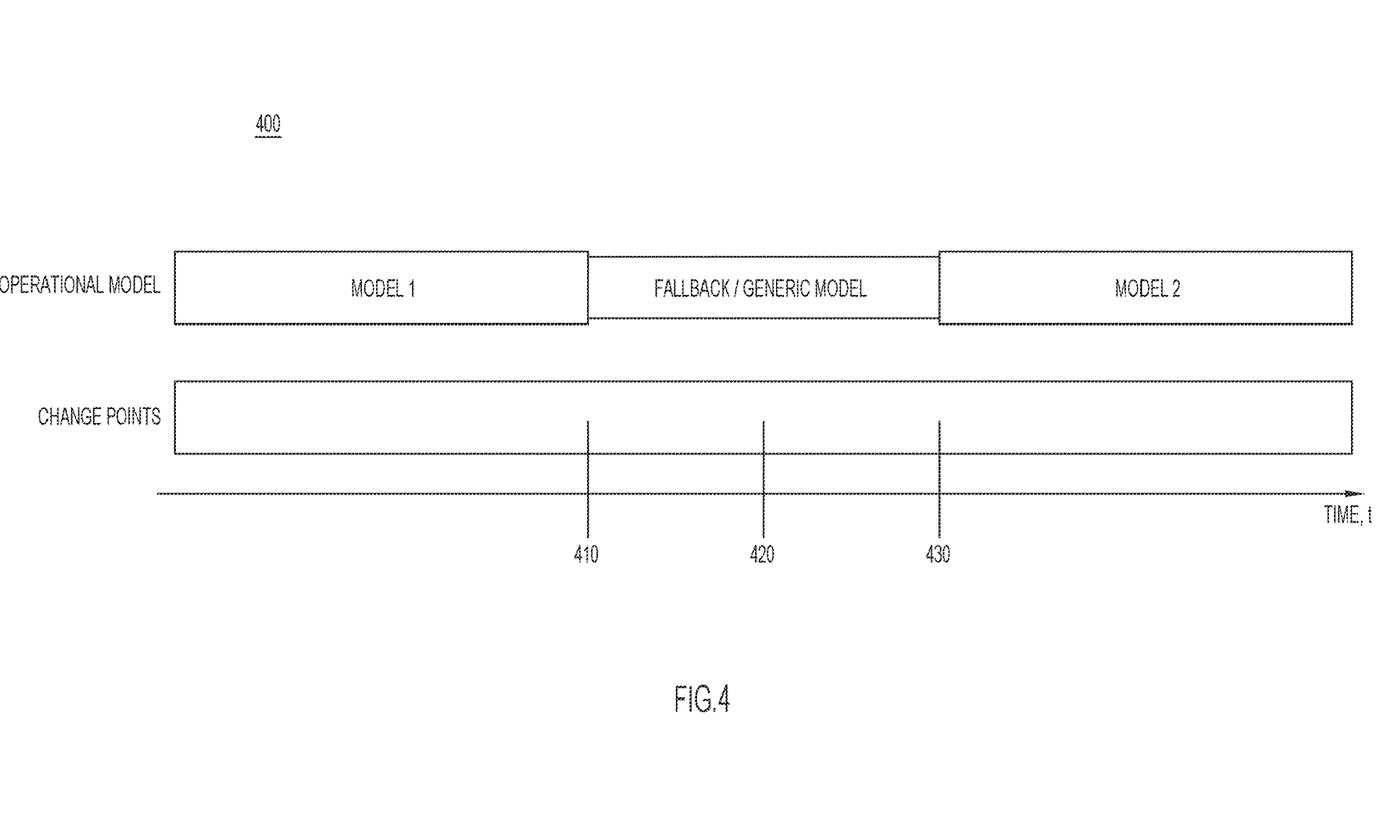
FIG. 4 is a diagram depicting a timeline for model drift and retraining, in accordance with an example embodiment.

FIG. 4 is a diagram depicting a timeline 400 for model drift and retraining, in accordance with an example embodiment. As depicted, timeline 400 includes two change points 410 and 420, and a point 430 at which sufficient training data is collected.

In particular, a first predictive model (i.e., "Model 1") is employed until change point 410 is identified. Once change point 410 is identified, a fallback model is applied and the first predictive model may be deactivated. Additionally, time-series data may be collected at change point 410 to be used as new training data. However, before a sufficient amount of time-series data can be collected for training purposes, a second change point 420 occurs, thus necessitating the need to restart the collection of training data, as the network's behavior may have again changed. Once point 430 is reached, sufficient training data has been gathered, and a new model (i.e., "Model 2") can be trained and employed to replace the fallback model.

Figure 5:
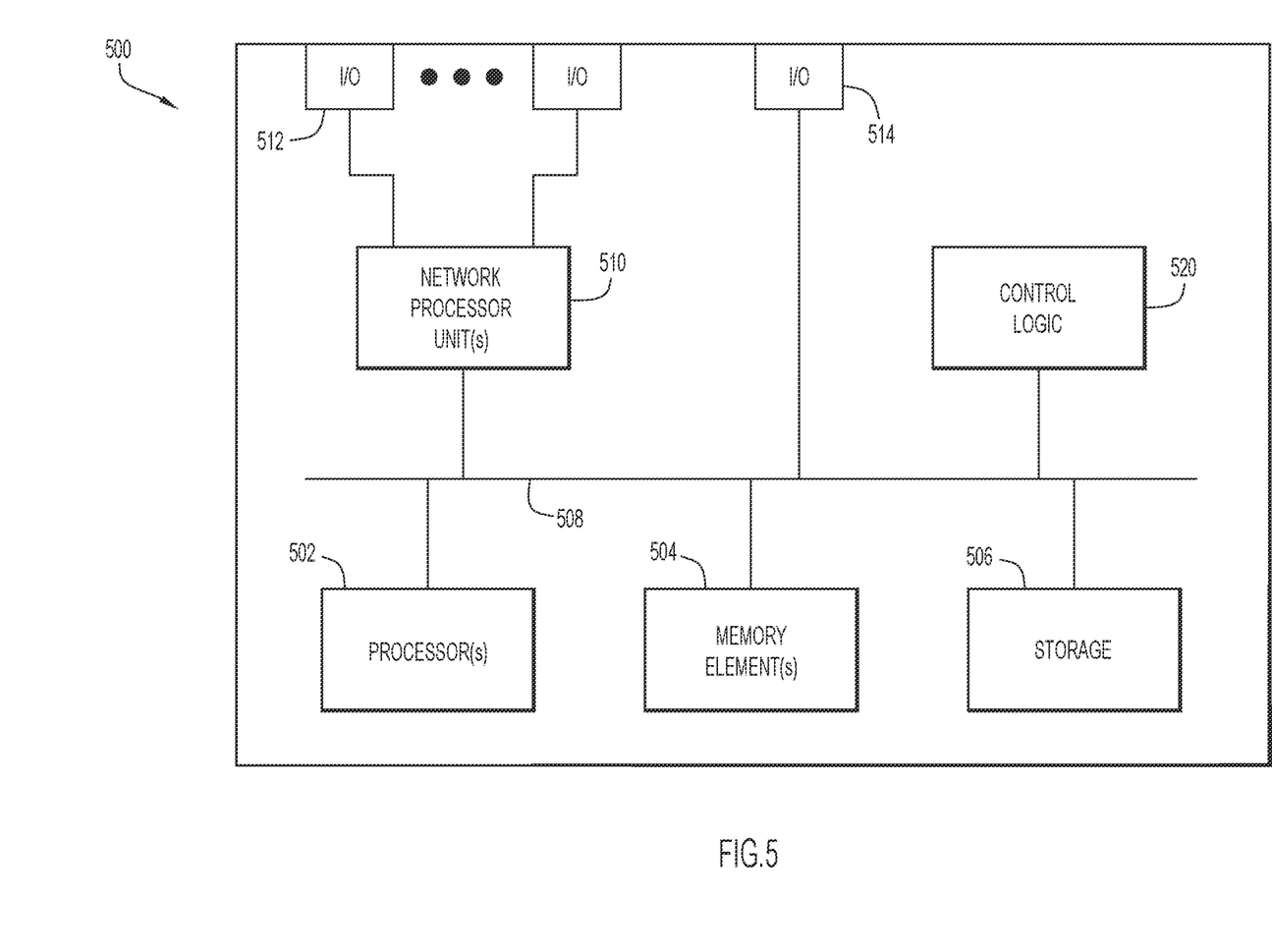
FIG. 5 is a block diagram depicting a computing device configured to train a predictive model and/or detect model drift, in accordance with an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device;

interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: obtaining a plurality of streams of time-series telemetry data, the time-series telemetry data generated by network devices of a data network, analyzing the plurality of streams to identify a subset of streams, wherein each stream of the subset of streams includes telemetry data that is substantially empirically distributed, analyzing the subset of streams of time-series data to identify a change point, in response to identifying the change point, obtaining additional time-series data from one or more streams of the plurality of streams of time-series telemetry data, and training a predictive model using the additional time-series data to update the predictive model and provide a trained predictive model.

In another form, the method further includes computing a matrix profile using the subset of streams of time-series data, and identifying a plurality of sliding windows based on a repeating pattern of the subset of streams of time-series data.

In another form, analyzing the subset of streams to identify the change point comprises comparing time-series data of one window to time-series data of a previous window to determine a density ratio on consecutive time intervals.

In another form, the method further includes applying the trained predictive model to identify network events of interest.

In another form, analyzing the subset of streams to identify the change point is further based on an occurrence of one or more predefined network events.

In another form, analyzing the subset of streams to identify the change point comprises comparing an occurrence of one or more network anomalies with respect to an expected repair time for the one or more network anomalies.

In another form, the method further includes in response to identifying the change point, deactivating a current predictive model and applying a fallback model to identify network events of interest.

In one form, a computer system is provided, comprising: one or more computer processors; one or more computer readable storage media; and program instructions stored on the one or more computer readable storage media for execution by at least one of the one or more computer processors, the program instructions comprising instructions to: obtain a plurality of streams of time-series telemetry data, the time-series telemetry data generated by network devices of a data network, analyze the plurality of streams to identify a subset of streams, wherein each stream of the subset of streams includes telemetry data that is substantially empirically distributed, analyze the subset of streams of time-series data to identify a change point, in response to identifying the change point, obtain additional time-series data from one or more streams of the plurality of streams of time-series telemetry data, and train a predictive model using the additional time-series data to update the predictive model and provide a trained predictive model.

In one form, one or more computer readable storage media is provided, the one or more computer readable storage media collectively having program instructions embodied therewith, the program instructions executable by a computer to cause the computer to: obtain a plurality of streams of time-series telemetry data, the time-series telemetry data generated by network devices of a data network, analyze the plurality of streams to identify a subset of streams, wherein each stream of the subset of streams includes telemetry data that is substantially empirically distributed, analyze the subset of streams of time-series data to identify a change point, in response to identifying the change point, obtain additional time-series data from one or more streams of the plurality of streams of time-series telemetry data, and train a predictive model using the additional time-series data to update the predictive model and provide a trained predictive model.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a plurality of streams of time-series telemetry data, the time-series telemetry data generated by network devices of a data network;
    analyzing the plurality of streams to identify a subset of streams, wherein each stream of the subset of streams includes telemetry data that substantially matches an empirical distribution function;
    analyzing the subset of streams of time-series data to identify a change point by:
        computing a matrix profile using the subset of streams of time-series data, and
        identifying a plurality of windows based on a repeating pattern of the subset of streams of time-series data;
    in response to identifying the change point, obtaining additional time-series data from one or more streams of the plurality of streams of time-series telemetry data; and
    re-training a predictive model using the additional time-series data to update the predictive model and provide a trained predictive model.

2. The computer-implemented method of claim 1, wherein analyzing the subset of streams to identify the change point comprises comparing time-series data of one window to time-series data of a previous window to determine a density ratio on consecutive time intervals.

3. The computer-implemented method of claim 1, further comprising:
    applying the trained predictive model to identify network events of interest.

4. The computer-implemented method of claim 1, wherein analyzing the subset of streams to identify the change point is further based on an occurrence of one or more predefined network events.

5. The computer-implemented method of claim 1, wherein analyzing the subset of streams to identify the change point comprises comparing an occurrence of one or more network anomalies with respect to an expected repair time for the one or more network anomalies.

6. The computer-implemented method of claim 1, further comprising:
    in response to identifying the change point, deactivating a current predictive model and applying a fallback model to identify network events of interest.

7. An apparatus comprising:
    one or more computer processors;
    a network interface configured to enable network communications;
    one or more computer readable storage media; and
    program instructions stored on the one or more computer readable storage media for execution by at least one of the one or more computer processors, the program instructions comprising instructions to:
        obtain a plurality of streams of time-series telemetry data, the time-series telemetry data generated by network devices of a data network;
        analyze the plurality of streams to identify a subset of streams, wherein each stream of the subset of streams includes telemetry data that substantially matches an empirical distribution function;
        analyze the subset of streams of time-series data to identify a change point by:
            computing a matrix profile using the subset of streams of time-series data, and
            identifying a plurality of windows based on a repeating pattern of the subset of streams of time-series data;
        in response to identifying the change point, obtain additional time-series data from one or more streams of the plurality of streams of time-series telemetry data; and
        re-train a predictive model using the additional time-series data to update the predictive model and provide a trained predictive model.

8. The apparatus of claim 7, wherein analyzing the subset of streams to identify the change point comprises comparing time-series data of one window to time-series data of a previous window to determine a density ratio on consecutive time intervals.

9. The apparatus of claim 7, wherein the program instructions further comprise instructions to:
    apply the trained predictive model to identify network events of interest.

10. The apparatus of claim 7, wherein analyzing the subset of streams to identify the change point is further based on an occurrence of one or more predefined network events.

11. The apparatus of claim 7, wherein analyzing the subset of streams to identify the change point comprises comparing an occurrence of one or more network anomalies with respect to an expected repair time for the one or more network anomalies.

12. The apparatus of claim 7, wherein the program instructions further comprise instructions to:
    in response to identifying the change point, deactivate a current predictive model and apply a fallback model to identify network events of interest.

13. One or more non-transitory computer readable storage media collectively having program instructions embodied therewith, the program instructions executable by a computer to cause the computer to:
    obtain a plurality of streams of time-series telemetry data, the time-series telemetry data generated by network devices of a data network;
    analyze the plurality of streams to identify a subset of streams, wherein each stream of the subset of streams includes telemetry data that substantially matches an empirical distribution function;
    analyze the subset of streams of time-series data to identify a change point by:
        computing a matrix profile using the subset of streams of time-series data, and
        identifying a plurality of windows based on a repeating pattern of the subset of streams of time-series data;
    in response to identifying the change point, obtain additional time-series data from one or more streams of the plurality of streams of time-series telemetry data; and train a predictive model using the additional time-series data to update the predictive model and provide a trained predictive model.

14. The one or more non-transitory computer readable storage media of claim 13, wherein analyzing the subset of streams to identify the change point comprises comparing time-series data of one window to time-series data of a previous window to determine a density ratio on consecutive time intervals.

15. The one or more non-transitory computer readable storage media of claim 13, wherein the program instructions further cause the computer to:
apply the trained predictive model to identify network events of interest.

16. The one or more non-transitory computer readable storage media of claim 13, wherein analyzing the subset of streams to identify the change point is further based on an occurrence of one or more predefined network events.

17. The one or more non-transitory computer readable storage media of claim 13, wherein analyzing the subset of streams to identify the change point comprises comparing an occurrence of one or more network anomalies with respect to an expected repair time for the one or more network anomalies.

18. The computer-implemented method of claim 1, wherein the additional time-series data that is used to re-train the predictive model is collected for a threshold amount of time after the change point is identified.

19. The apparatus of claim 7, wherein the additional time-series data that is used to re-train the predictive model is collected for a threshold amount of time after the change point is identified.

20. The one or more non-transitory computer readable storage media of claim 13, wherein the additional time-series data that is used to re-train the predictive model is collected for a threshold amount of time after the change point is identified.

\* \* \* \* \*